J. W. BRAY.
Milk-Strainer.

No. 163,632.

Patented May 25, 1875.

WITNESSES
Mary S. Utley
Emry H. Bates

INVENTOR
John W. Bray,
Chipman & ...
ATTORNEYS

UNITED STATES PATENT OFFICE.

JOHN W. BRAY, OF LA HARPE, ILLINOIS.

IMPROVEMENT IN MILK-STRAINERS.

Specification forming part of Letters Patent No. 163,632, dated May 25, 1875; application filed April 17, 1875.

*To all whom it may concern:*

Be it known that I, JOHN W. BRAY, of La Harpe, in the county of Hancock and State of Illinois, have invented a new and valuable Improvement in Milk and Gravy Strainers; and I do hereby declare that the following is a full, clear, and exact description of the construction and operation of the same, reference being had to the annexed drawings, making a part of this specification, and to the letters and figures of reference marked thereon.

Figure 1:
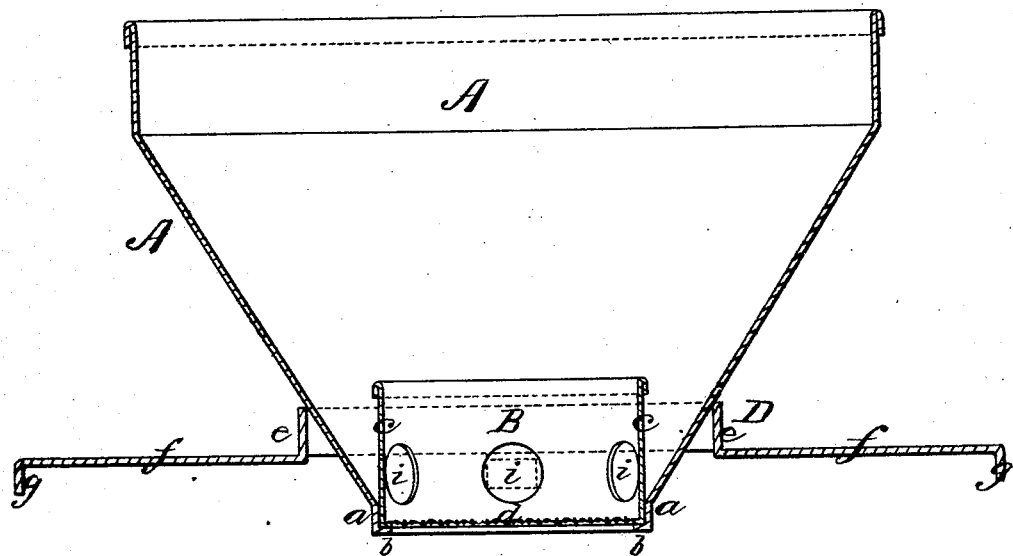
Figure 2:
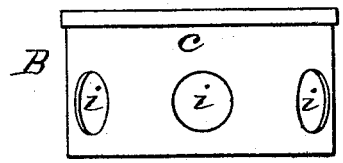

Figure 1 of the drawings is a representation of a vertical section of my strainer, and Fig. 2 is a detail view of the same.

This invention has relation to improvements in sieves, which are especially appropriate to the straining of milk, gravy, and the like; and the nature of the invention consists in combining with a funnel-shaped vessel a detachable sieve, having a perforated rim or hook adapted to fit snugly in the small end of the funnel, whereby any desired quantity of milk or gravy may be strained at once, and the straining device is capable of being readily detached for cleansing, all as will be hereinafter more fully explained.

In the annexed drawings, A designates a funnel-shaped vessel of any desired size, made of wood, metal, or any other suitable material, which funnel is provided at its reduced end with a cylindrical flange, $a$, the lower end of which is swaged or otherwise turned inward to form a supporting-ledge, $b$, for the rim $c$ of a sieve, B, which latter fits snugly in the funnel, forming a tight joint therewith. In this position ledge $b$ will sustain the sieve and will prevent it from being forced through the cylindrical part of the funnel, when it is subjected to the strain of pouring gravy therein. Rim $c$ of sieve B is of considerable height, and it is provided with a number of perforations, $i$, for a purpose hereinafter explained. Its lower edge is also turned inward by swaging or otherwise, forming a ledge, resting upon which the wire-cloth part $d$ of the sieve will receive adequate support. This cloth is secured to the rim $c$ by soldering, and being well supported from below it is but little liable to be torn loose therefrom when subjected to strain.

Sieve B having been inserted into the funnel, as shown in Fig. 1, gravy or milk poured into the funnel will flow down the sides of the former against the rim $c$ of the latter, then through perforations $i$ into the interior of the sieve, pouring through which it will fall into a vessel below provided for its reception, leaving its coarser particles in the sieve. The latter may be readily detached from the funnel for the purpose of being cleansed, and when thus removed rim $c$ will afford a convenient hold for the purpose, thus avoiding and obviating injury and possible destruction to the wire-cloth.

D represents a supporting-spider, consisting of an annulus, $e$, within which funnel A is adapted to be received, and a number of radial arms, $f$, of suitable rigidity, the hooked ends $g$ of which are adapted to be engaged over the edge of a vessel, into which the substance to be strained is designed to be delivered.

What I claim as new, and desire to secure by Letters Patent, is—

In a strainer the detachable sieve B, having a perforated rim, $c$, and the funnel-shaped vessel A, having a cylindrical part, $a$, and a supporting-ledge, $b$, combined and arranged substantially as specified.

In testimony that I claim the above I have hereunto subscribed my name in the presence of two witnesses.

JOHN W. BRAY.

Witnesses:
 JEREMIAH SMITH,
 W. H. PORTER.